(12) United States Patent
Fujiyama et al.

(10) Patent No.: US 10,290,078 B2
(45) Date of Patent: May 14, 2019

(54) IMAGE PROCESSING APPARATUS, IMAGE PROCESSING METHOD, AND RECORDING MEDIUM

(71) Applicants: Ryotaro Fujiyama, Kanagawa (JP); Takashi Ishida, Kanagawa (JP); Naoto Tsuruoka, Kanagawa (JP); Kyoko Hashimoto, Kanagawa (JP); Shin Yamauchi, Tokyo (JP)

(72) Inventors: Ryotaro Fujiyama, Kanagawa (JP); Takashi Ishida, Kanagawa (JP); Naoto Tsuruoka, Kanagawa (JP); Kyoko Hashimoto, Kanagawa (JP); Shin Yamauchi, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 14 days.

(21) Appl. No.: 15/642,696

(22) Filed: Jul. 6, 2017

(65) Prior Publication Data
US 2018/0018755 A1    Jan. 18, 2018

(30) Foreign Application Priority Data

Jul. 14, 2016  (JP) ................................. 2016-139292

(51) Int. Cl.
*G06T 3/40*       (2006.01)
*G10L 15/22*   (2006.01)
(Continued)

(52) U.S. Cl.
CPC .............. *G06T 3/40* (2013.01); *G06F 3/038* (2013.01); *G06F 3/041* (2013.01); *G06F 3/0416* (2013.01);
(Continued)

(58) Field of Classification Search
None
See application file for complete search history.

(56) References Cited

U.S. PATENT DOCUMENTS

| 5,737,740 A * | 4/1998 | Henderson ............ G06F 3/0488 178/18.03 |
| 2002/0051958 A1* | 5/2002 | Khalsa ................... G09B 19/22 434/238 |

(Continued)

FOREIGN PATENT DOCUMENTS

| JP | 2000-268460 | 9/2000 |
| JP | 2004-015332 | 1/2004 |
| JP | 2014-199490 | 10/2014 |

*Primary Examiner* — David H Chu
(74) *Attorney, Agent, or Firm* — Oblon, McClelland, Maier & Neustadt, L.L.P.

(57) ABSTRACT

An image processing apparatus includes circuitry that converts user voices that are input into a string of characters reflecting a statement made with the user voices, retrieves one or more items of information related to the string, stores the information being retrieved associated with identification information indicating a retrieval time when the information is retrieved, draws a graphical image including the information being stored on a projection target image to be projected by a projector, and controls the projector to project the projection target image including the graphical image, the graphical image having a size that is determined in accordance with the identification information associated with the information included in the graphical image being projected.

18 Claims, 21 Drawing Sheets

(51) Int. Cl.
*G10L 15/26* (2006.01)
*G06F 3/16* (2006.01)
*G06F 3/0488* (2013.01)
*G06F 3/0484* (2013.01)
*G06F 3/038* (2013.01)
*G06F 3/041* (2006.01)
*G06F 3/042* (2006.01)
*G06F 3/0482* (2013.01)
*G06F 3/0486* (2013.01)

(52) U.S. Cl.
CPC .......... *G06F 3/0425* (2013.01); *G06F 3/0482* (2013.01); *G06F 3/04845* (2013.01); *G06F 3/04883* (2013.01); *G06F 3/167* (2013.01); *G10L 15/22* (2013.01); *G10L 15/265* (2013.01); *G06F 3/0486* (2013.01); *G06F 2203/0381* (2013.01); *G06F 2203/04808* (2013.01); *G10L 15/26* (2013.01); *G10L 2015/223* (2013.01)

(56) References Cited

U.S. PATENT DOCUMENTS

| | | | |
|---|---|---|---|
| 2002/0082949 A1* | 6/2002 | Desormeaux, Jr. | G06Q 10/06 705/14.4 |
| 2004/0246236 A1* | 12/2004 | Hildebrandt | G06F 3/038 345/169 |
| 2012/0317108 A1* | 12/2012 | Okazaki | G06F 3/0488 707/732 |
| 2013/0030851 A1* | 1/2013 | Rahmouni | G06Q 10/00 705/7.11 |
| 2013/0132867 A1* | 5/2013 | Morris | G06F 3/048 715/759 |
| 2013/0184558 A1* | 7/2013 | Gallant | A61B 5/0042 600/409 |
| 2013/0339969 A1* | 12/2013 | Koski | G06Q 10/10 718/103 |
| 2014/0016761 A1* | 1/2014 | Werner | H04M 3/5133 379/88.11 |
| 2014/0098103 A1* | 4/2014 | Hirsch | G06T 11/206 345/440 |

* cited by examiner

FIG. 2A
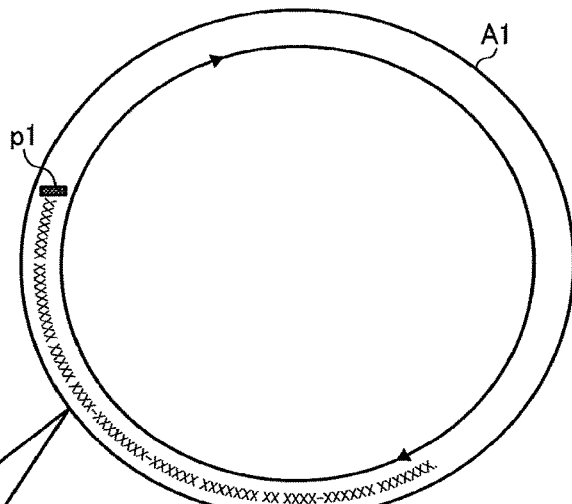
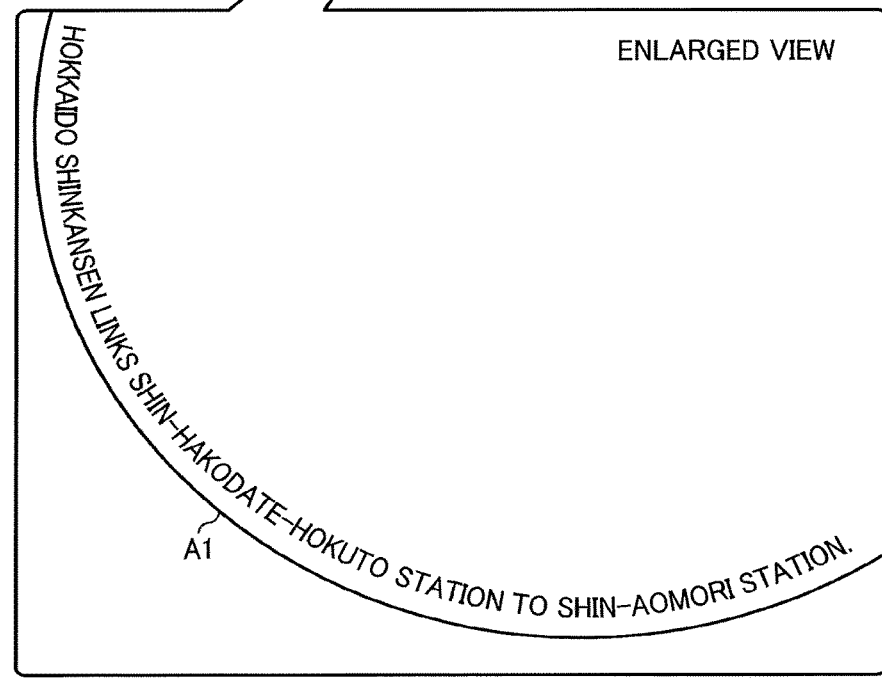

FIG. 2B
(3) HOKKAIDO SHINKANSEN LINKS SHIN-HAKODATE-HOKUTO STATION TO SHIN-AOMORI STATION
A1
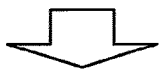
(4) HOKKAIDO SHINKANSEN · SHIN-HAKODATE-HOKUTO STATION · SHIN-AOMORI STATION
A1
(5) IMAGE RETRIEVAL FIG. 3
| FIG. 3A |
| FIG. 3B |
| FIG. 3C |
FIG. 3A
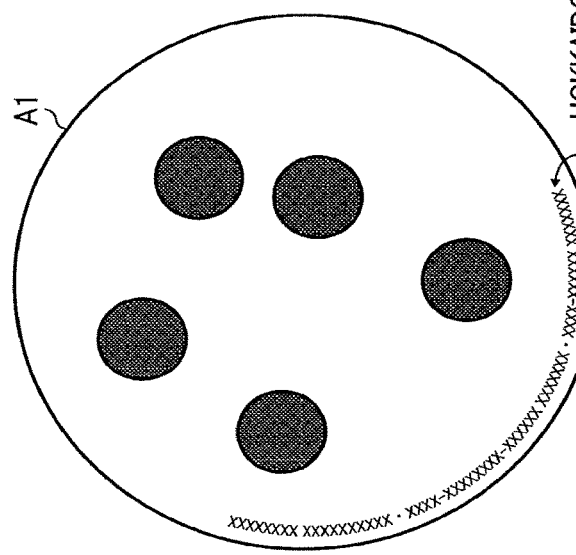
HOKKAIDO SHINKANSEN · SHIN-HAKODATE-HOKUTO STATION · SHIN-AOMORI STATION
(1)
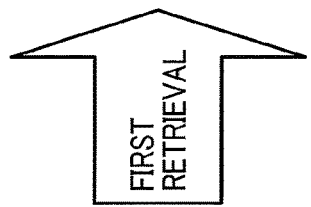
FIRST RETRIEVAL

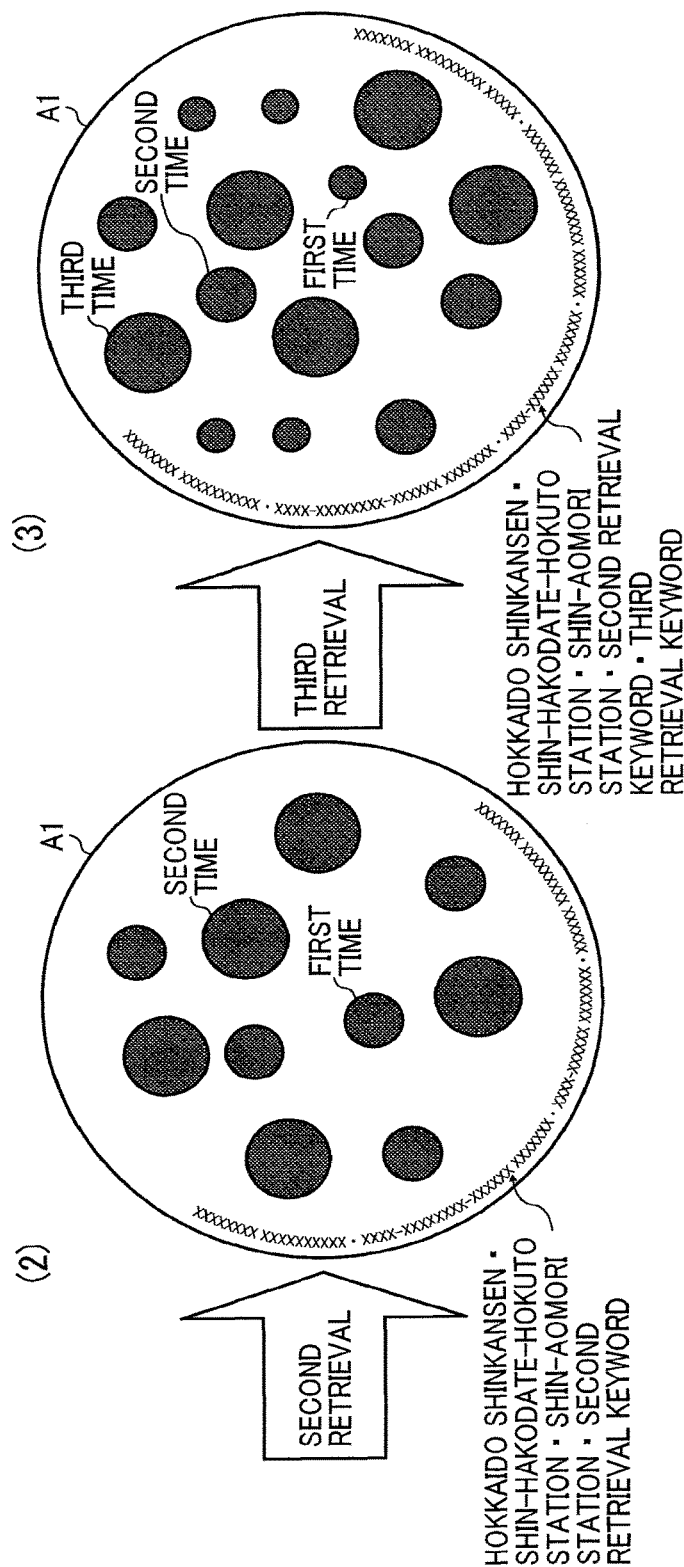

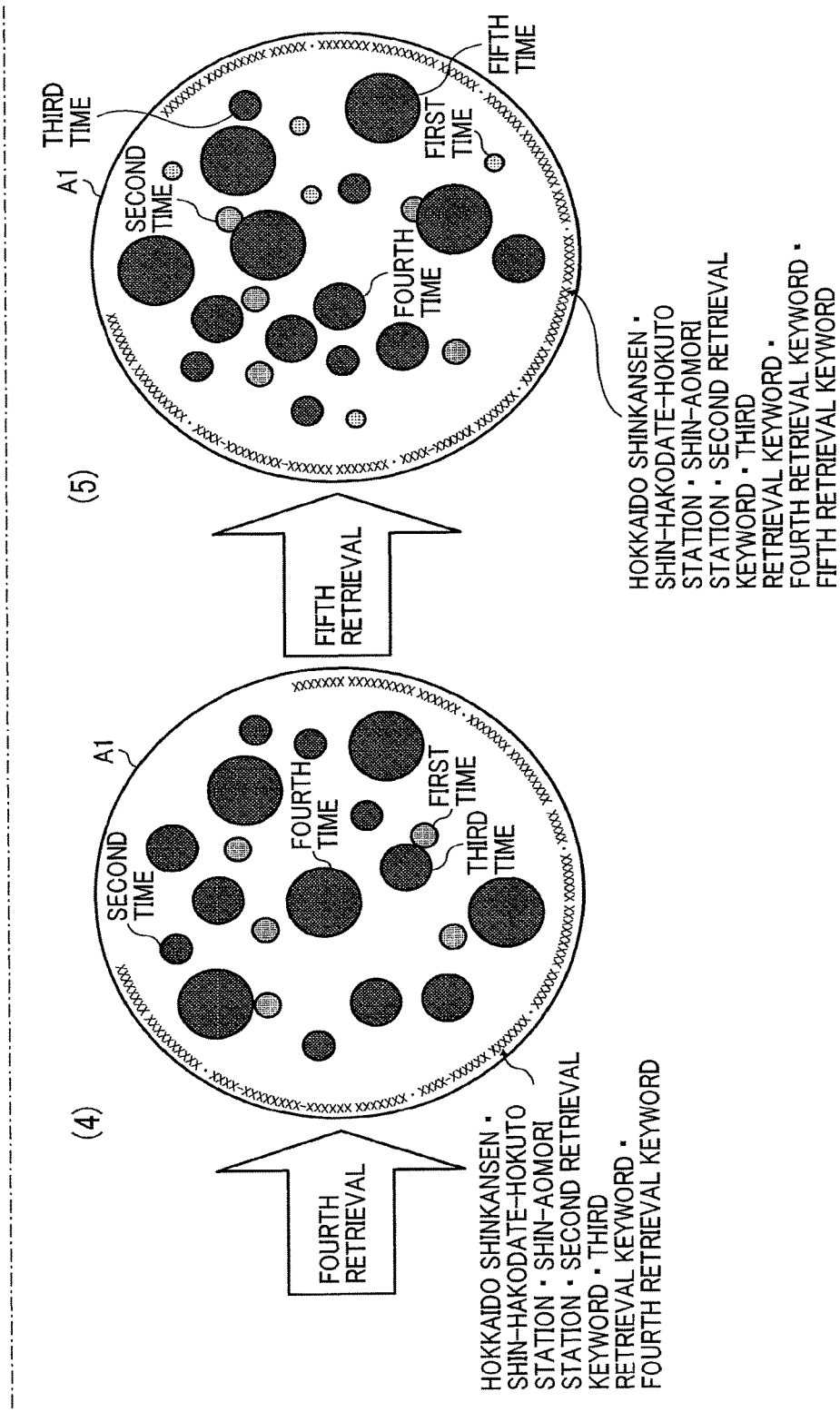

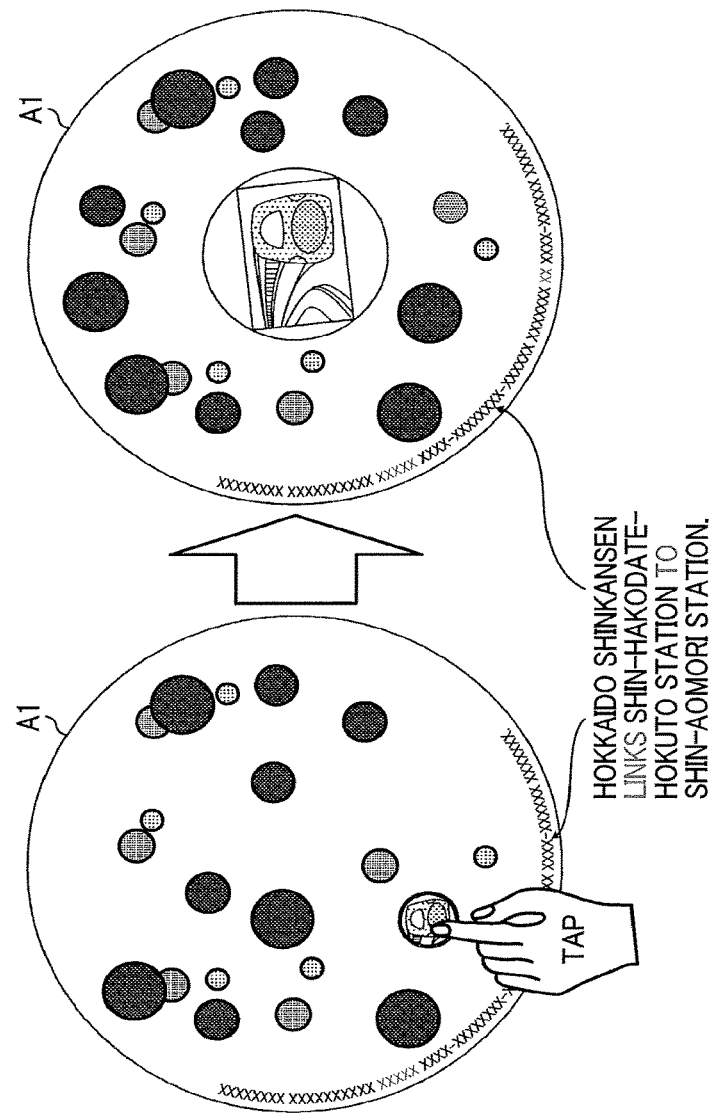

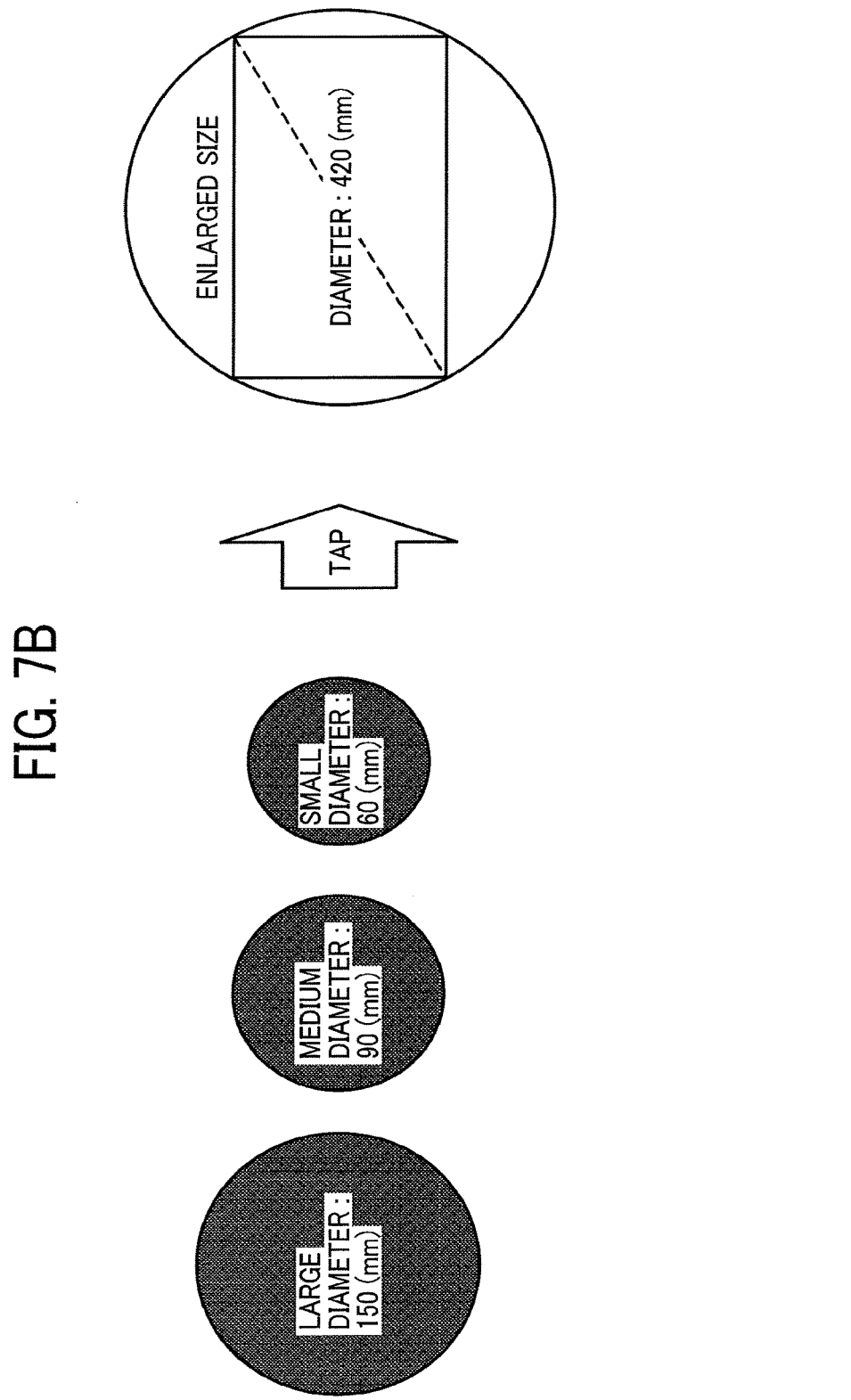

80 — ● MICROPHONE
90 — ■ INFRARED LED

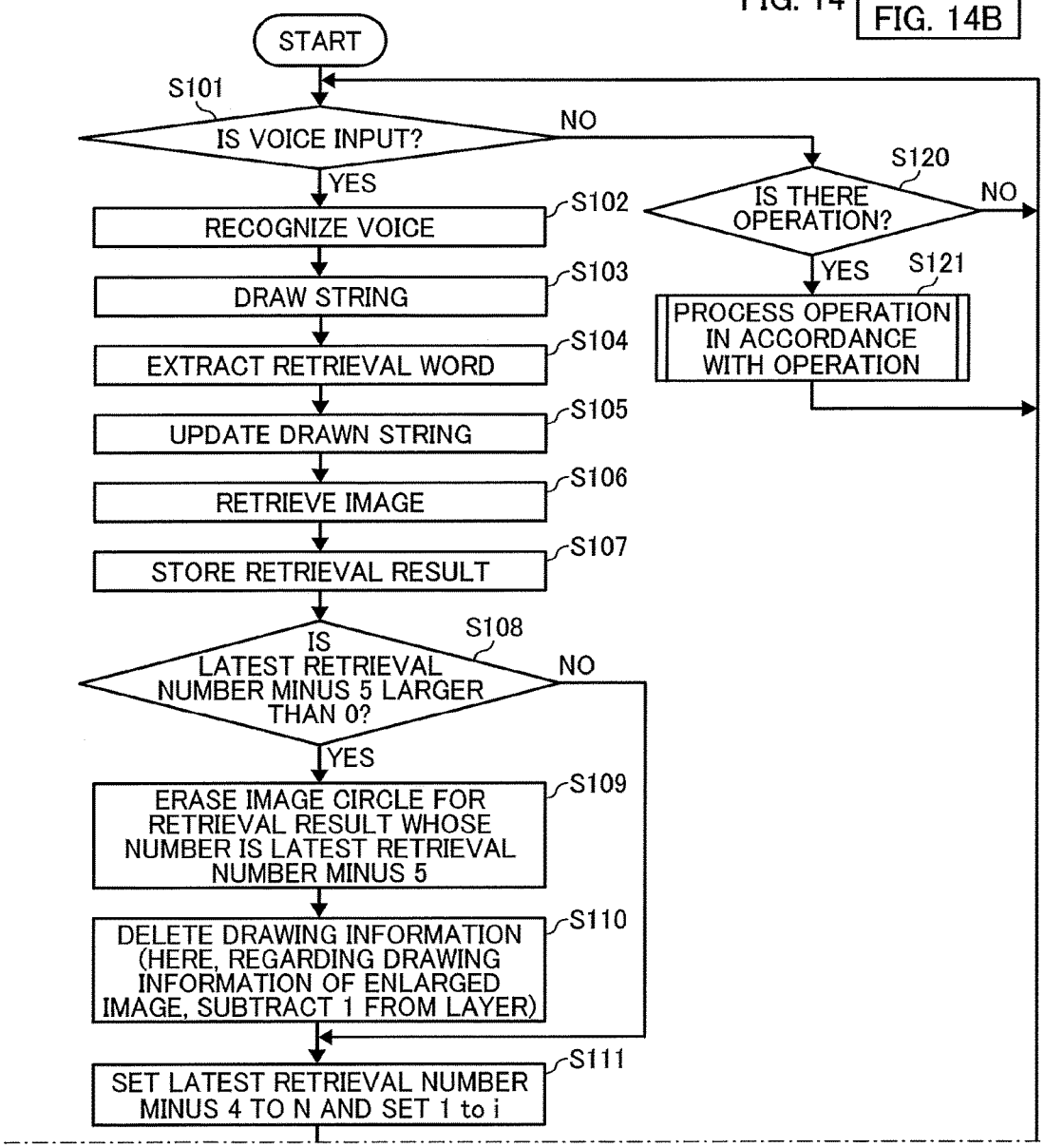

FIG. 15

| RETRIEVAL NUMBER | IMAGE ID GROUP |
|---|---|
| 1 | JPG0001<br>JPG0002<br>JPG0003<br>JPG0004<br>JPG0005 |
| 2 | JPG0006<br>⋮ |
| 3 | JPG0011<br>⋮ |
| 4 | JPG0016<br>⋮ |
| 5 | JPG0021<br>⋮ |
| 6 | JPG0026<br>⋮ |

FIG. 16

| IMAGE ID | POSITION | ORIENTATION | LAYER | SIZE | ENLARGING FLAG |
|---|---|---|---|---|---|
| JPG0001 | (X1, Y1) | 30° | 3 | SMALL 3 | FALSE |
| JPG0002 | (X2, Y2) | 300° | 3 | SMALL 3 | FALSE |
| JPG0003 | (X3, Y3) | 45° | 3 | SMALL 3 | FALSE |
| JPG0004 | (X4, Y4) | 0° | 3 | SMALL 3 | FALSE |
| JPG0005 | (X5, Y5) | 330° | 3 | SMALL 3 | FALSE |
| JPG0006 | (X6, Y6) | 20° | 2 | SMALL 2 | FALSE |
| ⋮ | ⋮ | ⋮ | ⋮ | ⋮ | ⋮ |
| JPG0011 | (X11, Y11) | : | 1 | SMALL | FALSE |
| ⋮ | ⋮ | ⋮ | ⋮ | ⋮ | ⋮ |
| JPG0016 | (X16, Y16) | : | 1 | MIDDLE | FALSE |
| ⋮ | ⋮ | ⋮ | ⋮ | ⋮ | ⋮ |
| JPG0021 | (X16, Y21) | : | 1 | LARGE | FALSE |
| ⋮ | ⋮ | ⋮ | ⋮ | ⋮ | ⋮ |

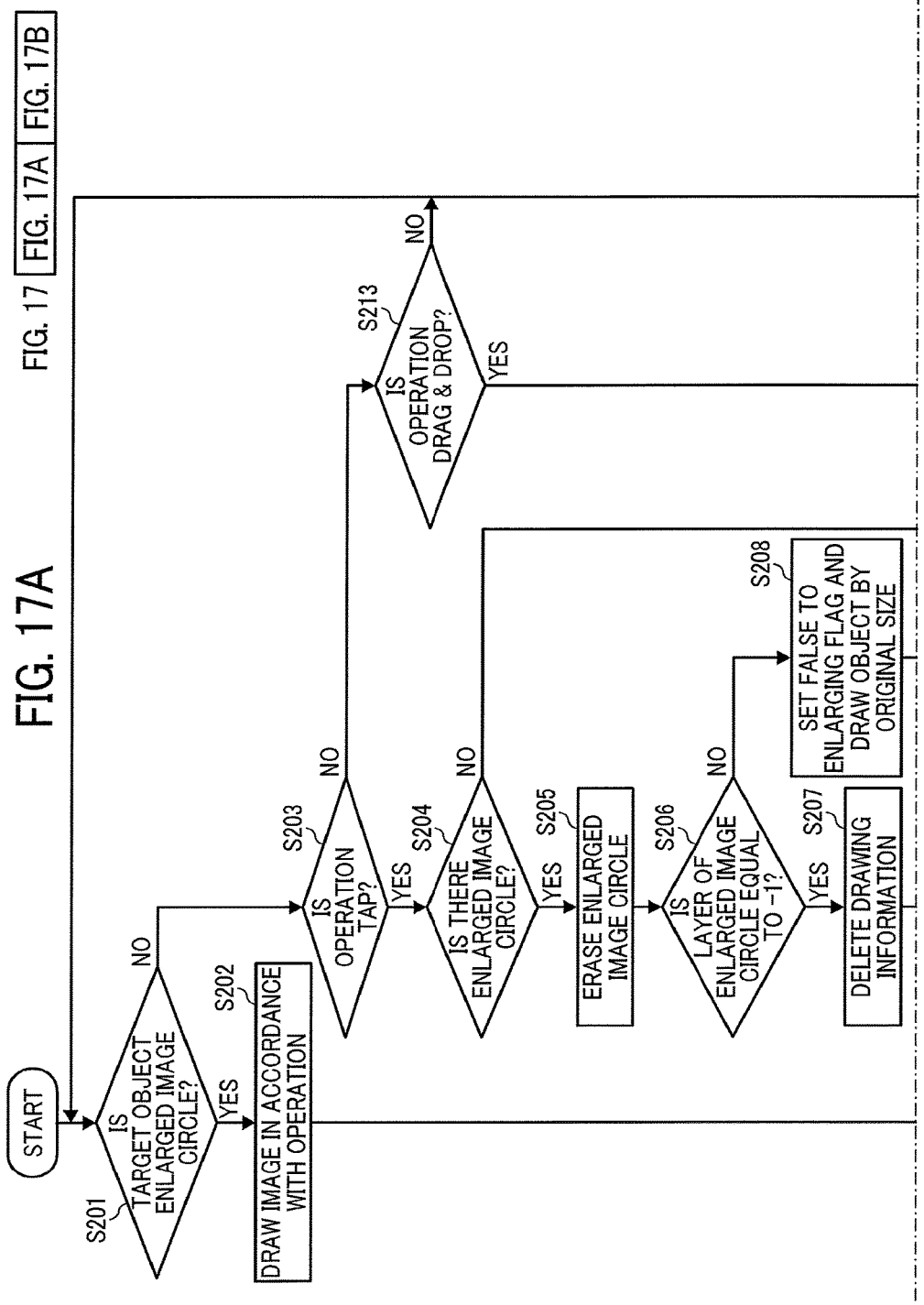

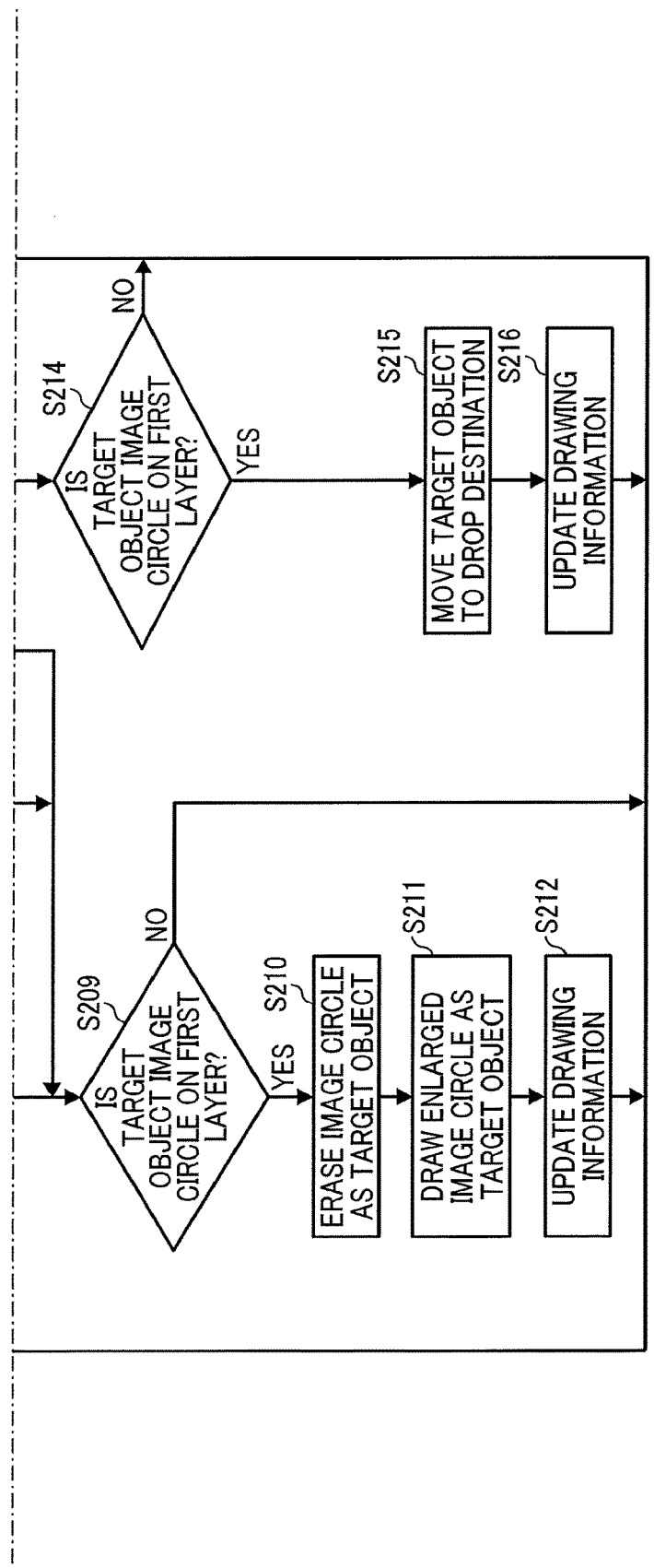

IMAGE PROCESSING APPARATUS, IMAGE PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2016-139292, filed on Jul. 14, 2016 in the Japan Patent Office, the entire disclosure of which is hereby incorporated by reference herein.

BACKGROUND

Technical Field

The present invention relates to an image processing apparatus, an image processing method, and a non-transitory recording medium storing an image processing program.

Background Art

In brainstorming sessions, participants are encouraged to think out of the box and freely exchange any ideas without limitation. Through exchanging various types of idea, a group of participants are expected to come up with creative solutions.

However, even in such free and open environment, it is sometimes difficult for the participants to continuously come up with new ideas.

SUMMARY

Example embodiments of the present invention provide a novel image processing apparatus that includes circuitry that converts user voices that are input into a string of characters reflecting a statement made with the user voices, retrieves one or more items of information related to the string, stores the information being retrieved associated with identification information indicating a retrieval time when the information is retrieved, draws a graphical image including the information being stored on a projection target image to be projected by a projector, and controls the projector to project the projection target image including the graphical image, the graphical image having a size that is determined in accordance with the identification information associated with the information included in the graphical image being projected.

Further example embodiments of the present invention provide a method of processing an image and a non-transitory recording medium storing an image processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 2A and 2B are diagrams illustrating operations from speech by user act to display of a string as an embodiment of the present invention;

FIGS. 3A, 3B, and 3C are diagrams illustrating a displayed retrieval result as an embodiment of the present invention;

FIGS. 7A and 7B are diagrams illustrating an operation performed on an image circle as an embodiment of the present invention;

FIGS. 14A and 14B are a flowchart illustrating operations performed by the image processing apparatus as an embodiment of the present invention;

FIG. 15 is a diagram illustrating a configuration of a retrieval history storing unit as an embodiment of the present invention;

FIG. 16 is a diagram illustrating a configuration of a drawing information storing unit as an embodiment of the present invention, and FIGS. 17A and 17B are a flowchart illustrating operations performed in accordance with user operation as an embodiment of the present invention.

Figure 1A:
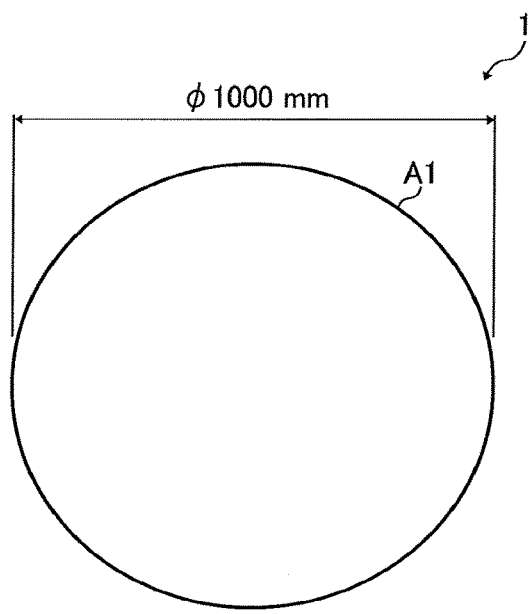
FIGS. 1A and 1B are diagrams illustrating an exterior appearance of a conversation facilitating apparatus as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Figure 1B:
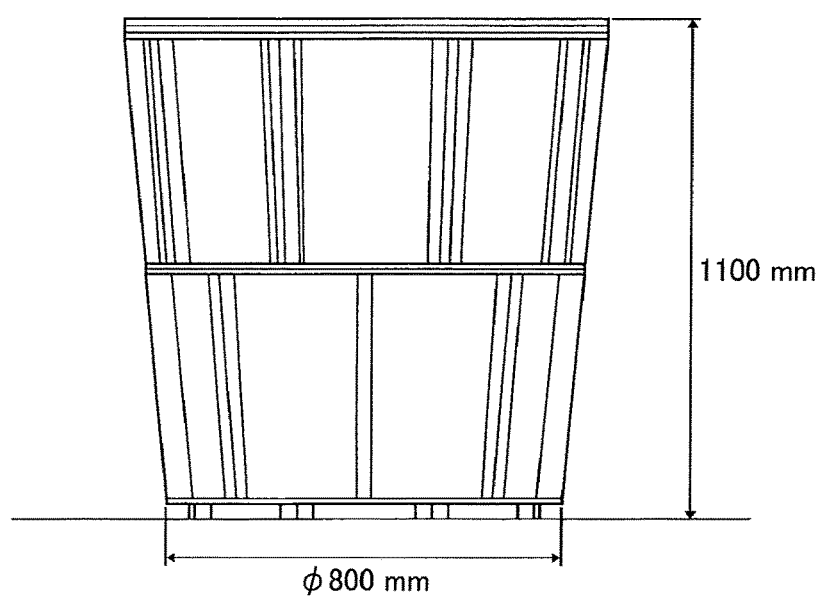

Exemplary embodiments of this disclosure are now described below with reference to the accompanying drawings. FIGS. 1A and 1B are diagrams illustrating an exterior appearance of a conversation facilitating apparatus 1 in this embodiment. FIG. 1A is a top view of the conversation facilitating apparatus 1, and FIG. 1B is a side view of the conversation facilitating apparatus 1. For example, a top surface of the conversation facilitating apparatus 1 has a circular shape whose diameter is 1000 mm, and a lower surface of the conversation facilitating apparatus 1 has a circular shape whose diameter is 800 mm. In addition, a height of the conversation facilitating apparatus 1 from the bottom to the top surface is 1100 mm. In addition, the top surface and the lower surface are concentric circles. That is, the shape of the conversation facilitating apparatus 1 is like a truncated cone placed upside-down. It should be noted that the shape and size of the conversation facilitating apparatus 1 is just an example. In this embodiment, the shape and size of the conversation facilitating apparatus 1 are adopted so that users standing around the conversation facilitating apparatus 1 may easily operate the top surface of the conversation facilitating apparatus 1.

The top surface of the conversation facilitating apparatus 1 serves as a projection surface that an image is projected by a projector 20 (described later) and an area that the image is operable by user operation such as touch operation etc. Hereinafter, the top surface of the conversation facilitating apparatus 1 is referred to as an operation area A1.

Next, with reference to FIGS. 2A to 8B, an overview of an operation performed by the conversation facilitating apparatus 1 is described below. FIGS. 2A and 2B are diagrams illustrating operations from inputting a speech statement made by a user to displaying a string of characters in this embodiment.

For example, as illustrated in FIG. 2A (1), it is assumed that one of users operating the conversation facilitating apparatus 1 says "Hokkaido shinkansen links Shin-Hakodate-hokuto station to Shin-aomori station." In this case, as illustrated in FIG. 2A (2), along a circumference of the operation area A1, in the counterclockwise direction from a typing start position p1, each character that constructs a character string representing the speech statement is typed. In FIG. 2A (2), an enlarged part where the string is typed is illustrated. The typed string rotates slowly in the clockwise direction. It should be noted that, if the circumference is filled with the string, the oldest character disappears first.

As the user stops speaking for a certain period of time, the typed string is entered for analysis. In the analysis, a noun is extracted from the string for word retrieval. As illustrated in FIG. 2B (3), the extracted noun stays without changing its position, and non-extracted characters become transparent and disappear.

Next, as illustrated in FIG. 2B (4), for example, each of the extracted nouns is displayed in red and separated by a character "•". Subsequently, a retrieval using an image related to the extracted nouns is performed in FIG. 2B (5). For example, an image published on the Internet is a retrieval target. In addition, the retrieval may be performed using a generic search engine.

FIGS. 3A, 3B, and 3C are diagrams illustrating a displayed retrieval result in this embodiment. Five circles are displayed on the operation area A1 illustrated in FIG. 3A (1). These circles are circles including the retrieved image (hereinafter referred to as "image circle"). In this embodiment, among retrieved images, each of the image circles for top five images is displayed in the operation area A1. Here, five images are just an example, and images less than five or images equal to or more than six may be displayed. It should be noted that images are rectangular generally. Therefore, for example, after enlarging/reducing the image so that the long side of the image becomes a predetermined length (e.g., 200 pixels), the image circle may be generated by cutting an area of a circle whose radius r from the center of the image is 50 pixels for example. Each image circle moves (flows) within the operation area A1 slowly in the random directions by random water flow, which is displayed virtually.

FIG. 3B (2) illustrates a state of the operation area A1 after the second retrieval is performed (that is, the operations in FIGS. 2A to 2B are performed again). In FIG. 3B (2), there are multiple image circles having at least two types of image circles whose sizes are different, displayed in the operation area A1. The smaller image circles correspond to the image circles displayed after the first retrieval. The larger image circles are displayed after the second retrieval. That is, after the second retrieval is performed, the image circles displayed after the first retrieval are reduced in size. It should be noted that the image in the image circle is also reduced at the same reduction rate.

It should be noted that the string of characters being obtained through voice recognition after the second retrieval may be displayed sequentially, following the retrieval word extracted for the first retrieval. Alternatively, character strings to be used for each retrieval may be displayed as illustrated in FIG. 4.

Figure 4:
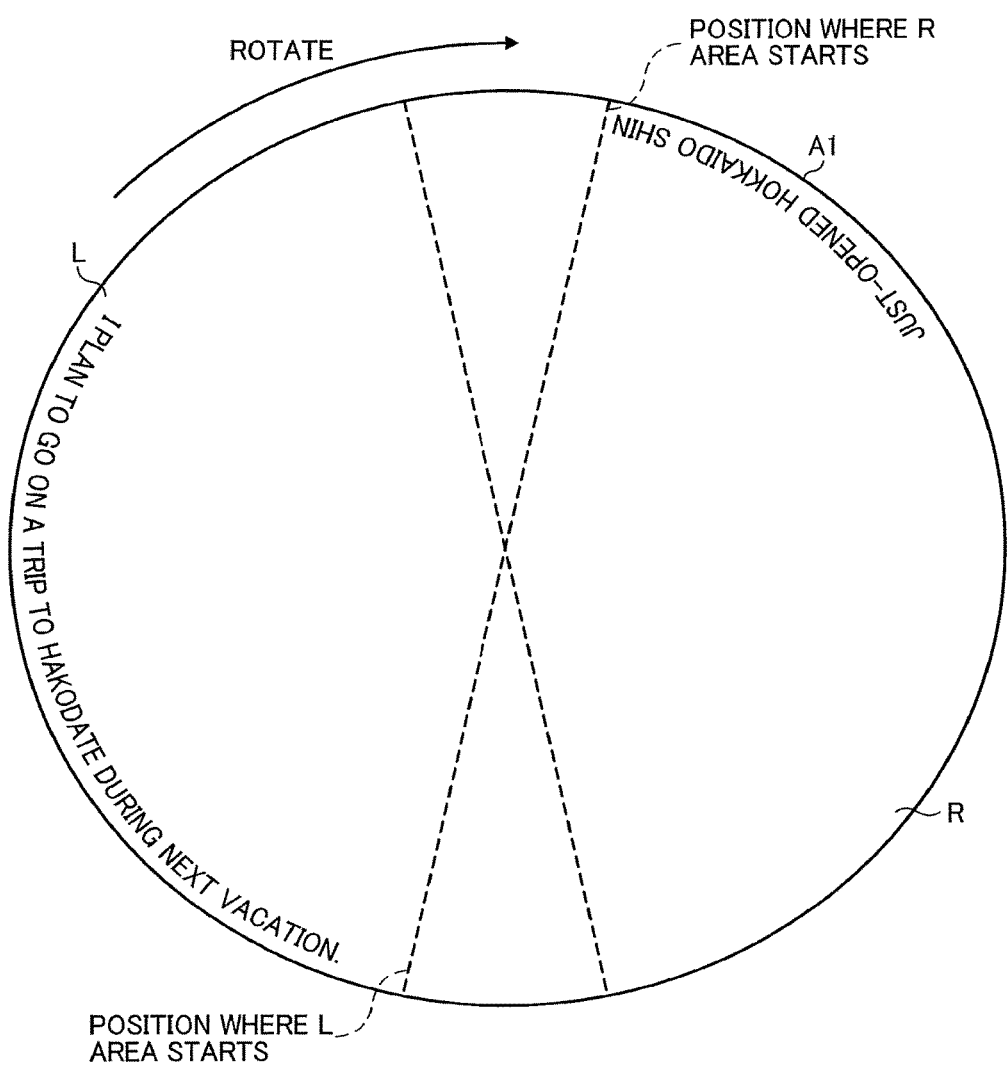
FIG. 4 is a diagram illustrating a displayed string used for retrieval as an embodiment of the present invention.

FIG. 4 is a diagram illustrating a displayed character string to be used for retrieval in this embodiment. FIG. 4 illustrates an example case in which an L area and an R area are formed in the operation area A1. Strings of characters being obtained through voice recognition for each retrieval are displayed in the L area or the R area alternately. The character string displayed in the L area is typed from a position where the L area starts. The string displayed in the R area is typed from a position where the R area starts.

Now, the description goes back to FIG. 3B. FIG. 3B (3) illustrates a state of the operation area A1 after the third retrieval is performed. In the operation area A1 in FIG. 3B (3), image circles of three different sizes are displayed. The smallest image circles are the image circles displayed after the first retrieval. The middle image circles are displayed after the second retrieval. The largest image circles are displayed after the third retrieval. That is, image circles other than the image circles for the third retrieval are reduced in size to be smaller than the size at the last retrieval.

FIG. 3C (4) illustrates a state of the operation area A1 after the fourth retrieval is performed. In the operation area A1 in FIG. 3C (4), image circles of four different sizes are displayed. The smallest image circles are the image circles displayed after the first retrieval. The second smallest image circles are the image circles displayed after the second retrieval. The third smallest image circles are the image circles displayed after the third retrieval. The largest image circles are displayed after the fourth retrieval. That is, image circles other than the image circles for the fourth retrieval are reduced in size to be smaller than the size at the last retrieval.

FIG. 3C (5) illustrates a state of the operation area A1 after the fifth retrieval is performed. In the operation area A1 in FIG. 3C (5), image circles of five different sizes are displayed. The smallest image circles are the image circles displayed after the first retrieval. The second smallest image circles are the image circles displayed after the second retrieval. The third smallest image circles are the image circles displayed after the third retrieval. The fourth smallest image circles are the image circles displayed after the fourth retrieval. The largest image circles are displayed after the fifth retrieval. That is, image circles other than the image circles for the fifth retrieval are reduced in size to be smaller than the size at the last retrieval.

As described above, in this embodiment, in accordance with a time when the image is retrieved, the size of the image circle for displaying the image changes. This enables a user to easily recognize relative context of the time when the image in the image circle is retrieved. This is further described below in detail with reference to FIG. 5.

Figure 5:
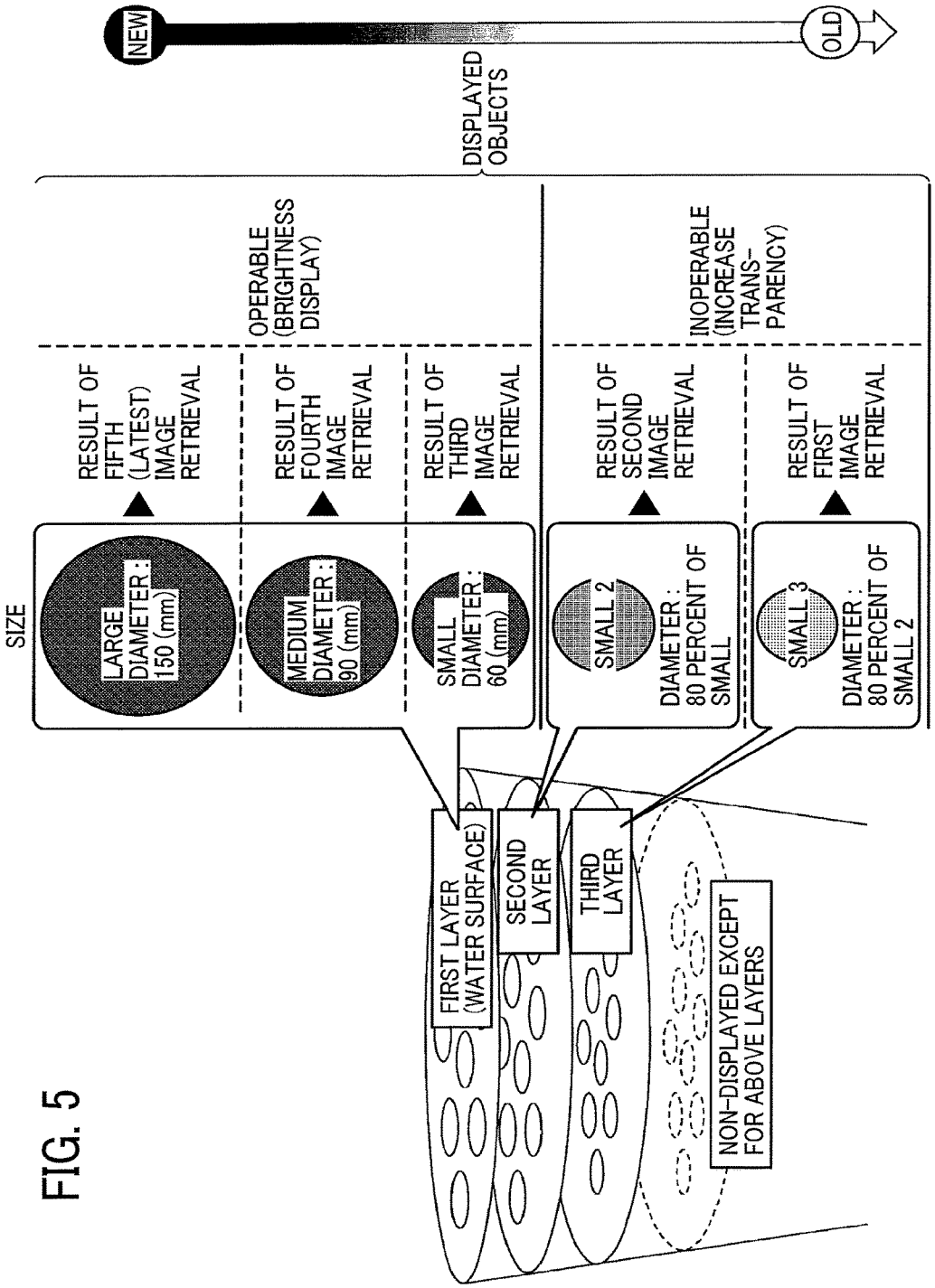
FIG. 5 is a diagram illustrating a relationship between timing of retrieval and a size of an image circle as an embodiment of the present invention.

FIG. 5 is a diagram illustrating a relationship between retrieval time and a size of an image circle in this embodiment. In this embodiment, regarding displaying image circles, a concept "layer" is introduced. As illustrated in FIG. 5, in this embodiment, three layers including the first layer to the third layer are defined.

The first layer is a layer that image circles from the last three retrievals belong. As a result, in FIG. 3C (5), image circles from the fifth retrieval, the fourth retrieval, and the third retrieval belong to the first layer. Image circles on the first layer are operable by user operation. In addition, image circles on the first layer may be displayed brighter than image circles on other layers (i.e., brightness of image circles displayed on the first layer may be increased compared to image circles on other layers). It should be noted, within the first layer, the sizes of the image circle are different in accordance with the retrieval time (the number of retrieval times). That is, the size of the image circle from the latest retrieval is large. The size of the image circle from the retrieval one time before the latest retrieval is a medium size that is smaller than the large size. The size of the image circle from the retrieval two times before the latest retrieval is a small size that is smaller than the medium size. It should be noted that the image circles belonging to the first layer are displayed so that each of the image circles does not overlap with each other.

The second layer is a layer that image circles from the retrieval three times before the latest retrieval belong. As a result, in FIG. 3C (5), image circles from the second retrieval belong to the second layer. The size of the image circles on the second layer is a "small 2" size that is smaller than the "small" size of the image circle in the first layer.

The third layer is a layer that image circles from the retrieval four times before the latest retrieval belong. As a result, in FIG. 3C (5), image circles from the first retrieval belong to the third layer. The size of the image circles on the third layer is a "small 3" size that is smaller than the "small 2" size of the image circle in the second layer.

It should be noted that the image circles on the second layer and the third layer are inoperable. In addition, transparency of the image circles on the third layer may be increased compared to transparency of the image circles on the second layer. Consequently, visibility of the inoperable image circles may be lowered so that possibility of misoperation by user operation is reduced. In addition, the image circles belonging to the second layer or the third layer may be displayed so that each of the image circles overlaps with each other (i.e., superimposition between image circles belonging to the second layer or the third layer may be allowed). In this case, regarding displaying the overlapped part, the image circle on the upper layer may be valid.

In addition, only image circles that belong to any one of the first layer, the second layer, and the third layer are displayed. Therefore, after performing a further retrieval from the status illustrated in FIG. 3C (5), the image circles from the first retrieval disappear from the operation area A1.

It should be noted that particular sizes of the "large" size, the "medium" size, the "small" size, the "small 2" size, and the "small 3" size of the image circles, illustrated in FIG. 5 are just examples.

Figure 6:
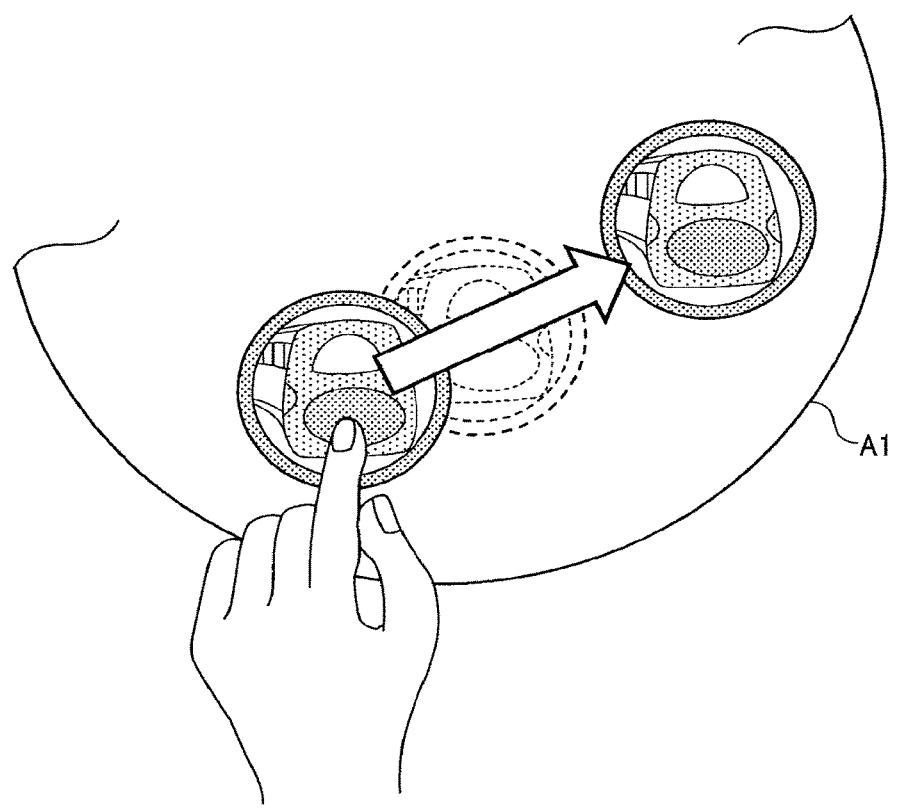
FIG. 6 is a diagram illustrating an operation performed on an image circle as an embodiment of the present invention.

FIG. 6 is a diagram illustrating an operation performed on an image circle in this embodiment. As illustrated in FIG. 6, the image circles that belong to the first layer may be moved by drag-and-drop by user operation.

FIGS. 7A and 7B are diagrams illustrating an operation performed on an image circle in this embodiment. As illustrated in FIG. 7A, after tapping an image circle by user operation, the image circle moves to the center of the operation area A1 and enlarged in size. The orientation of the image in the enlarged image circle may be the same as the orientation of the image circle just before the enlargement.

As illustrated in FIG. 7B, after tapping the image circle in the "large" size, the "medium" size, or the "small" size, the image circle is enlarged in the same enlarged size. In this case, the image itself in the image circle is displayed wholly in the enlarged image circle (hereinafter referred to as "enlarged image circle"). In this case, not a whole part of the image but only a part of the image may be displayed in the enlarged image circle.

It should be noted that the enlarged image circle is displayed upper than the first layer. That is, if the image circle other than the enlarged image circle overlaps with the enlarged image circle, the enlarged image circle is considered as valid regarding the display at the overlapped part. As a result, it may be considered that the enlarged image circle belongs to the zeroth layer upper than the first layer in other words. It is possible to consider that the string displayed in the retrieval belongs to the zeroth layer since the string is displayed on the uppermost layer of all image circles.

In example operation, even when the operation area A1 is in the state that the enlarged image circle is displayed, it is possible to perform retrieval. In this case, regardless of the retrieval time of the image in the enlarged image circle, the display of the enlarged circle image is maintained.

In example operation, when the operation area A1 is in the state that the enlarged image circle is displayed, if another image circle that belongs to the first layer is tapped, the enlarged image circle is replaced with the tapped other image circle. That is, there is one enlarged image circle at a maximum. However, it may be allowed to display multiple enlarged image circles at the same time. Furthermore, it is possible that the displayed position of the enlarged image circle is not fixed, and the enlarged image circle may move around randomly just like other image circles.

In example operation, when the operation area A1 is in the state that the enlarged image circle is displayed, if an area other than the image circle that belongs to the first layer is tapped, the enlargement of the enlarged image circle is released.

After releasing the enlargement of the enlarged image circle, the display of the image in the enlarged image circle goes back to the display of the image circle having the size in accordance with the retrieval time. For example, if the retrieval time of the image is three times before the latest retrieval, the image circle including the image belongs to the second layer. If the retrieval time of the image is five times before the latest retrieval, the image circle including the image is erased.

Figure 8A:
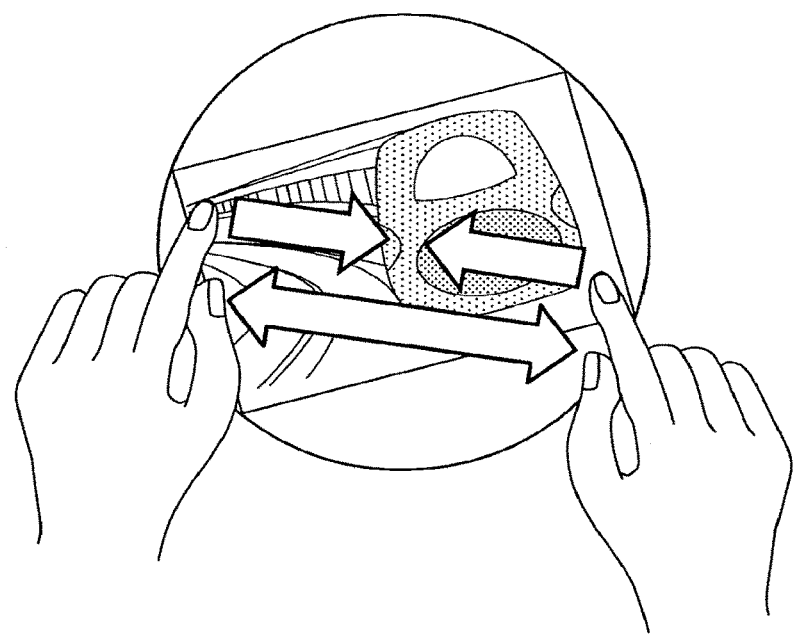
FIGS. 8A and 8B are diagrams illustrating an operation performed on an image circle as an embodiment of the present invention.
Figure 8B:
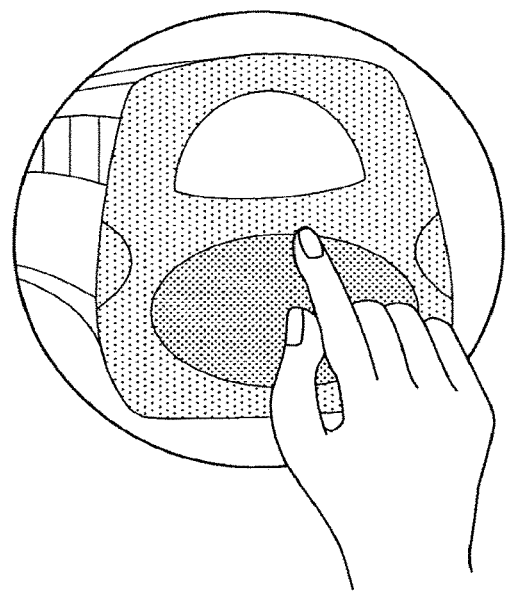

FIGS. 8A and 8B are diagrams illustrating an operation performed on an image circle in this embodiment. In FIGS. 8A and 8B, an operation performed on an image in the enlarged image circle is illustrated. As illustrated in FIG. 8A, for example, the image in the enlarged image circle may be enlarged by pinch-out and reduced by pinch-in.

In addition, as illustrated in FIG. 8B, the image in the enlarged image circle may be scrolled (moved) within the enlarged image circle by drag-and-drop.

Figure 9A:
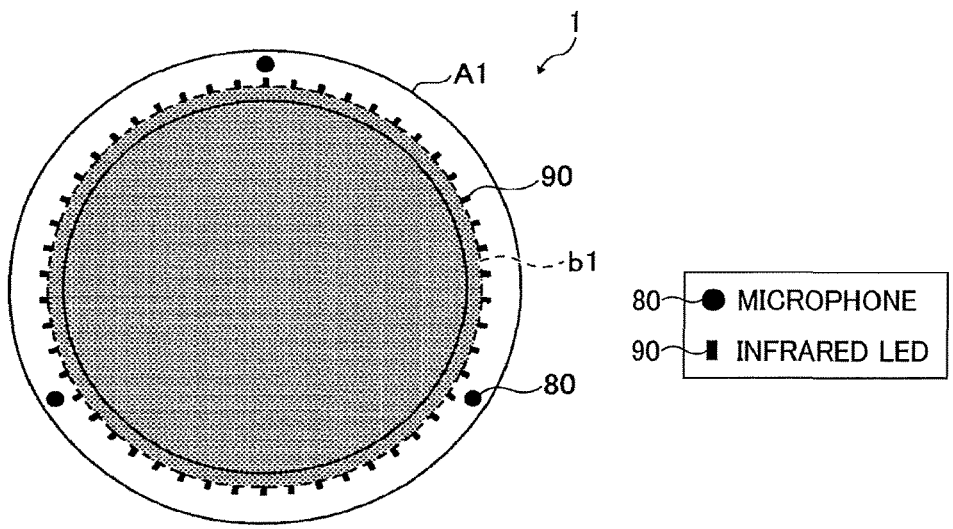
FIGS. 9A and 9B are diagrams illustrating a layout of components of the conversation facilitating apparatus as an embodiment of the present invention.
Figure 9B:
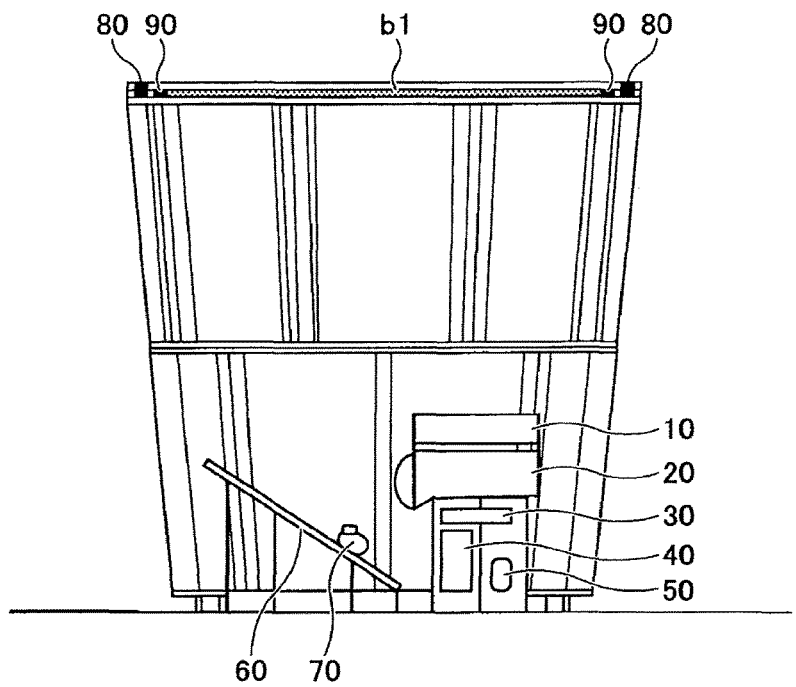

A specific example of the conversation facilitating apparatus 1 is described below. FIGS. 9A and 9B are diagrams illustrating a layout of components of the conversation facilitating apparatus in this embodiment. As illustrated in FIGS. 9A and 9B, for example, an acrylic resin b1 is mounted on a table that forms an upper surface of the conversation facilitating apparatus 1, and three microphones 80 and multiple infrared light emitting diodes (LEDs) 90 are laid out around the acrylic resin b1. The acrylic resin b1 serves as the operation area A1. Here, it is possible to form the operation area A1 using a material other than the acrylic resin. The microphone 80 is used for inputting voices of each user making a speech statement. The number of the microphones 80 may be less than three or equal to or more than four. The infrared LED 90 is used for detecting user operation performed on the acrylic resin b1.

The conversation facilitating apparatus 1 is provided with an image processing apparatus 10, a projector 20, a power outlet 30, a mixer 40, a fan 50, a mirror 60, and an infrared camera 70 etc.

The image processing apparatus 10 performs an operation of drawing an image as a target to be projected by the projector 20 (hereinafter referred to as "projection target image"). For example, a generic computer such as a personal computer (PC) etc. may be used as the image processing apparatus 10.

The projector 20 projects (outputs) the projection target image. The projection target image is reflected by the mirror 60 and projected on the back side of the acrylic resin b1. A sheet for rear projection is attached to the back side of the acrylic resin b1, so the image projected on the back side of the acrylic resin b1 is displayed on the front side of the acrylic resin b1. To extend the projection length from the projector 20 to the acrylic resin b1, the projection target image passes through the mirror 60, such that the image from the projector 20 can be easily focused on the acrylic resin b1. However, the mirror 60 is unnecessary if the projector 20 can sufficiently focus the image on the acrylic resin b1.

The power outlet 30 supplies electric power to the infrared LED 90, the image processing apparatus 10, the projector 20, the mixer 40, and the fan 50 etc. The mixer 40 mixes voice signals input from multiple microphone 80. The fan 50, small in size, circulates air to release heat inside the case to outside the case. The infrared camera 70 is used for detecting an operation on the acrylic resin b1 (operation area A1) by detecting a change of infrared emitted from the infrared LED 90.

Figure 10:
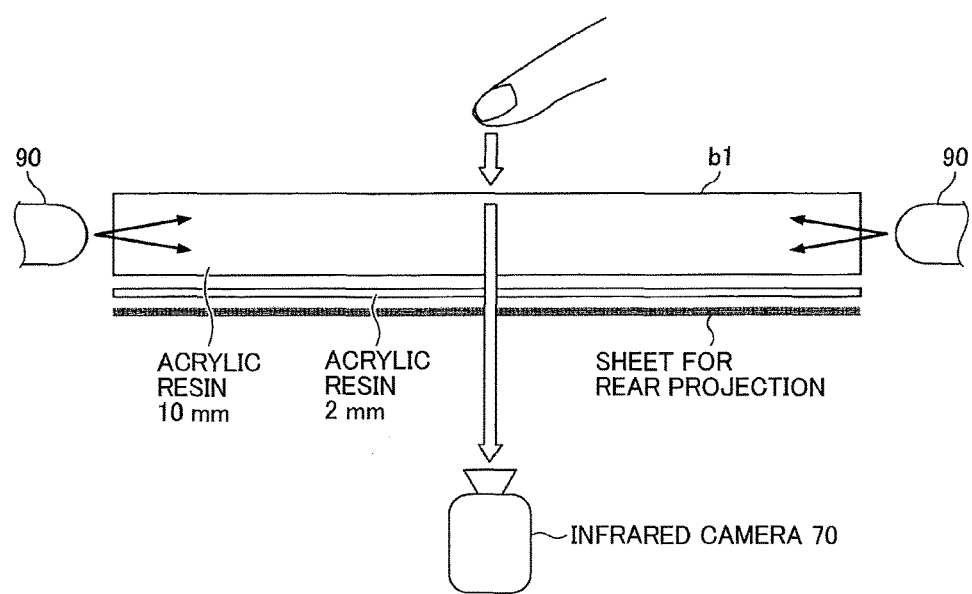
FIG. 10 is a diagram illustrating a configuration that detects an operation on an acrylic resin as an embodiment of the present invention.

FIG. 10 is a diagram illustrating a configuration that detects an operation on the acrylic resin in this embodiment. Each infrared LED 90 emits infrared to the inner side of the acrylic resin b1. If the front side of the acrylic resin b1 is touched by user operation, a refractive index on the front side of the acrylic resin b1 changes at the touched point. The touch and the touched point may be detected by detecting the change of the refractive index by the infrared camera 70.

It should be noted that the touch may be detected by using other methods (such as electrostatic capacity method etc.) adopted by generic touch panels.

Figure 11:
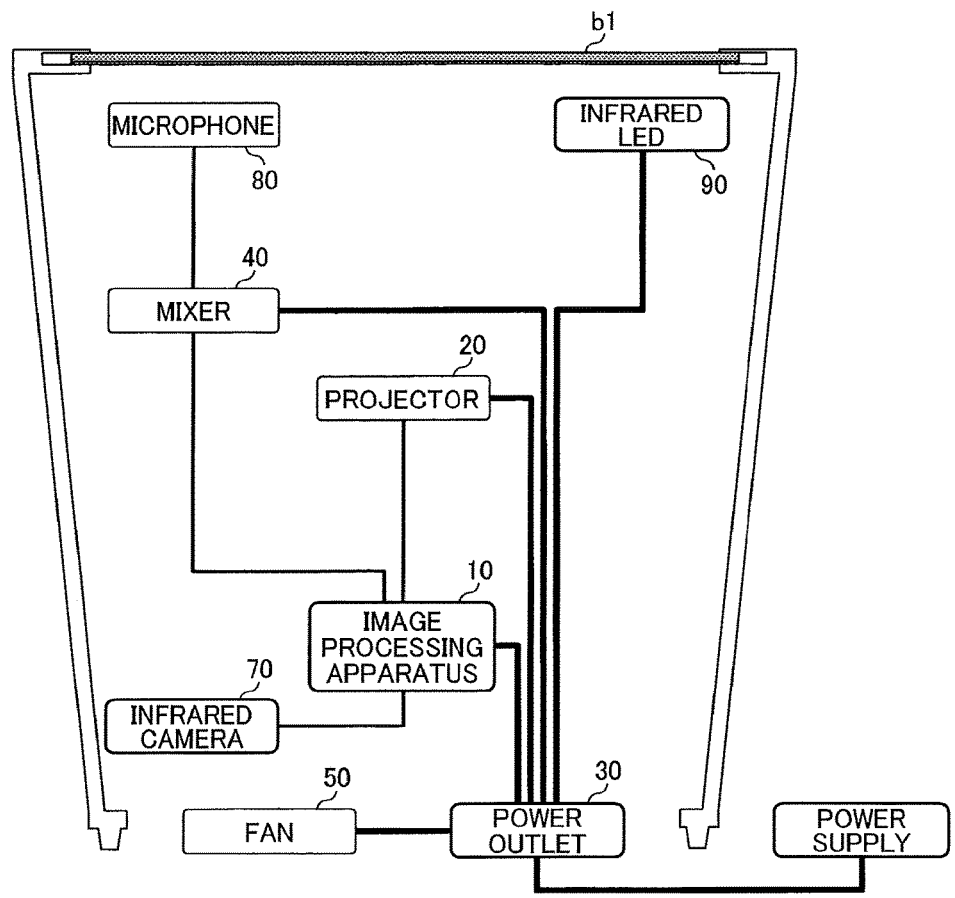
FIG. 11 is a diagram illustrating a connection relationship among components of the conversation facilitating apparatus as an embodiment of the present invention.

FIG. 11 is a diagram illustrating a connection relationship among components of the conversation facilitating apparatus in this embodiment. Each of the infrared LED 90, the mixer 40, the projector 20, the image processing apparatus 10, and the fan 50 is connected to the power outlet 30 by power cables. The image processing apparatus 10 is connected to the projector 20 via a communication interface that transfers images using a digital signal such as High-Definition Multimedia Interface (HDMI (registered trademark)) etc. Each of the microphones 80 is connected to the mixer 40 via audio cables. One audio cable integrated by the mixer 40 is connected to the image processing apparatus 10. The infrared camera 70 is connected to the image processing apparatus 10 via a Universal Serial Bus (USB) cable.

Figure 12:
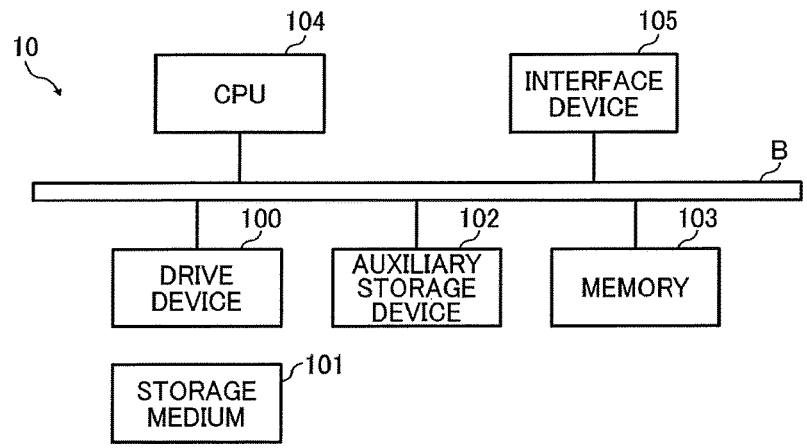
FIG. 12 is a schematic block diagram of a hardware configuration of an image processing apparatus as an embodiment of the present invention.

FIG. 12 is a schematic block diagram of a hardware configuration of the image processing apparatus in this embodiment. The image processing apparatus 10 in FIG. 12 includes a drive device 100, an auxiliary storage device 102, a memory 103 such as a random access memory (RAM), a central processing unit (CPU) 104, and an interface device 105 etc., and those components are connected with each other via a bus B.

A program that implements operations performed by the image processing apparatus is distributed in the form of a recording medium 101 such as a compact disc read only memory (CD-ROM) etc. After setting the recording medium 101 that stores the program in the drive device 100, the program is read from the recording medium 101 and installed in the auxiliary storage device 102 via the drive device 100. It is not always required to install the program using the recording medium 101, and it is possible to download the program from another computer via a network. The auxiliary storage device 102 stores the installed program, and the auxiliary storage device also stores required files and data etc.

After being requested to execute a program, the memory 103 reads the program from the auxiliary storage device 102 and stores the program therein. The CPU 104 executes the function implemented in the image processing apparatus 10 in accordance with the program stored in the memory 103. An interface with the audio cable, the communication interface with the projector 20, and the USB interface with the infrared camera 70 are collectively referred as the interface device 105.

Figure 13:
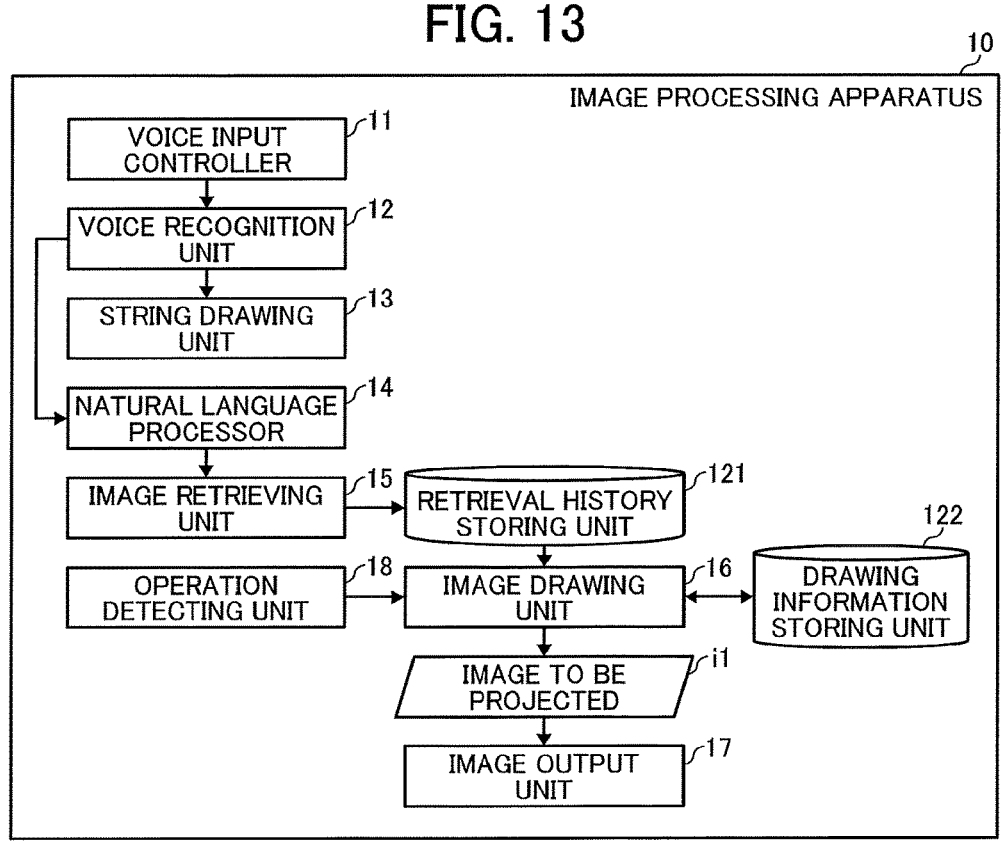
FIG. 13 is a schematic block diagram of a functional configuration of an image processing apparatus as an embodiment of the present invention.

FIG. 13 is a schematic block diagram of a functional configuration of the image processing apparatus in this embodiment. In FIG. 13, the image processing apparatus 10 includes an voice input controller 11, a voice recognition unit 12, a string drawing unit 13, a natural language processor 14, an image retrieving unit 15, an image drawing unit 16, an image output unit 17, and an operation detecting unit 18. The components described above may be implemented by executing one or more programs installed in the image processing apparatus 10 by the CPU 104. In addition, the image processing apparatus 10 utilizes a retrieval history storing unit 121 and a drawing information storing unit 122. For example, the storing units described above may be implemented by using the auxiliary storage device 102 or a storage device connectable to the image processing apparatus 10 via a network etc.

The voice input controller 11 controls inputting voice from the microphone 80 (mixer 40). The voice recognition unit 12 performs a voice recognition operation on the input voice and converts the voice into a string of characters (text data). It should be noted that the voice recognition operation may be performed by using any known technologies. The string drawing unit 13 draws the string acquired by the voice recognition unit 12 on the projection target image i1 at a corresponding part along the circumference of the operation area A1. The natural language processor 14 performs a natural language operation on the string acquired by the voice recognition unit 12 and extracts a word for retrieval from the string. The image retrieving unit 15 retrieves an image that matches the extracted word for retrieval from the Internet etc. The image drawing unit 16 draws the image circle including the retrieved image on the projection target image i1. The image output unit 17 outputs the projection target image i1 to the projector 20. In this embodiment, drawing the image circle on the projection target image i1 is equivalent to projecting the image circle by using the projector 20. For example, the projection target image i1 is stored in the memory 103. The operation detecting unit 18 detects user operation performed on the operation area A1.

The retrieval history storing unit 121 stores identification information of the retrieved image. The drawing information storing unit 122 stores information indicating a drawing status of the image circle on the projection target image i1.

Figure 14B:
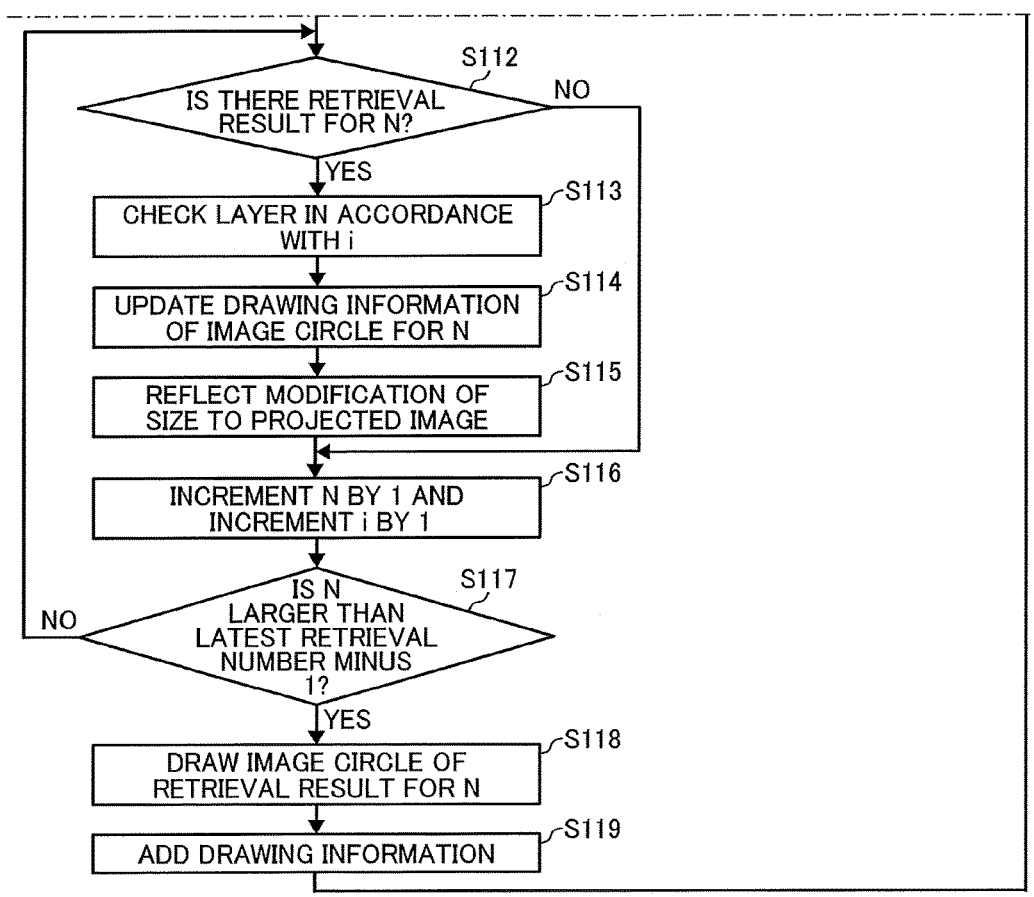

Operations performed by the image processing apparatus 10 are described below. FIGS. 14A and 14B are flowcharts illustrating operations performed by the image processing apparatus in this embodiment.

The voice input controller 11 waits for inputting of voice from the microphone 80 in S101. If voice of a speech statement from any one of the users capable of operating the conversation facilitating apparatus 1 is input via the microphone 80 to the voice input controller 11 (YES in S101), the voice recognition unit 12 performs the voice recognition operation on the input voice and coverts the voice into a string in S102. Subsequently, the string drawing unit 13 draws the converted string on the corresponding position on the projection target image i1 along the circumference of the operation area A1 in S103. As a result, the string is projected on the operation area A1. That is, the display illustrated in FIG. 2B is performed. After starting inputting voice, steps S102 and S103 are repeatedly performed until the input of the voice stops for a predetermined period of time. Hereinafter, the conversion result from the input voice to the string, based on the voice being input during a time period after inputting of voice is started until the inputting of voice stops, is referred to as "input string".

Next, the natural language processor 14 performs the natural language operation on the input string and extracts the word for retrieval from the input string in S104. For example, after parsing dependency, nouns included in the input string are extracted as the retrieval words. Based on the extraction result, the natural language processor 14 updates the input string displayed on the projection target image i1 in S105. More specifically, as illustrated in FIGS. 2C and 2D, the extracted retrieval words are separated by the character "•" and drawn on the projection target image i1. It should be noted that words other than noun may be considered as the retrieval words.

Next, the image retrieving unit 15 retrieves an image through the Internet etc. using the retrieval condition linking the extracted retrieval words using AND condition in S106.

Subsequently, the image retrieving unit 15 stores the retrieval result in the retrieval history storing unit 121 in S107.

FIG. 15 is a diagram illustrating a configuration of the retrieval history storing unit in this embodiment. In this embodiment, the retrieval history storing unit 121 corresponds to a database, or a table, which stores various information. In FIG. 15, the retrieval history storing unit 121 stores a record each time the retrieval is performed. Each record includes a retrieval number and an image ID group etc. Here, the retrieval is performed each time the operation in step S106 is performed.

The retrieval number is a value indicating the number of times that the retrieval is performed. In FIG. 15, a case that the retrieval is performed for six times is illustrated. The image ID group is a group of identification information for the retrieved image in the corresponding retrieval. In this embodiment, in the order of listing the retrieval results, image IDs for five images from the top is stored in the image ID group. Here, only five images from the top are extracted for display, to avoid displaying too many image circles on the operation area A1 to improve visibility.

Referring back to FIG. 14, the image drawing unit 16 determines whether or not the retrieval result whose retrieval number is equal to "the latest retrieval number minus 5" is stored in the retrieval history storing unit 121 in S108. That is, it is determined whether or not the retrieval result that belongs to the layer 3 exists at the present moment. If there is no corresponding retrieval result (i.e., the number of retrieval times up to them is equal to or less than five) (NO in S108), the operation proceeds to S111. If the corresponding retrieval result exists (YES in S108), the image drawing unit 16 erases the image circle corresponding to the image IDs included in the image ID groups in the corresponding retrieval result from the projection target image i1 in S109. However, at this step, the enlarged image circle is excluded from the target to be erased. As a result, the display of the enlarged image circle is maintained. Subsequently, the image drawing unit 16 deletes the record corresponding to the erased image circle from the drawing information storing unit 122 in S110.

FIG. 16 is a diagram illustrating a configuration of the drawing information storing unit in this embodiment. In this embodiment, the drawing information storing unit corresponds to a database, or a table. In FIG. 16, the drawing information storing unit 122 includes a record for each image circle drawn on the projection target image i1. Each record includes an image ID, position, orientation, layer, size, and enlarging flag etc.

The image ID is an identification of an image included in the image circle. The position corresponds to coordinate values indicating a position where the image circle including the image associated with the image ID is drawn. The position where the image circle is drawn indicates a center position of the image circle. Here, the coordinate values may be based on the coordinate system of the projection target image i1. The orientation indicates an orientation of the image associated with the image ID. For example, an angle between a long side of the image included in the image circle and a predetermined orientation (e.g., X-axis direction in the coordinate system of the projection target image i1) may be considered as the value of the orientation. The layer is a layer that the image associated with the image ID belongs. The size is a size of the image circle for the image associated with the image ID. In this embodiment, any one of the five sizes (i.e., large, medium, small, small 2, and small 3) illustrated in FIG. 5 may be considered as the value of the size. It should be noted, even if the corresponding image circle is enlarged, the value of the size may be any one of the five sizes. The enlarging flag is information indicating whether or not the image circle for the image corresponding to the image ID is enlarged. Here, TRUE indicates that the image circle is enlarged, and FALSE indicates that the image circle is not enlarged.

In S110, a record whose layer value is 3 and enlarging flag value is "FALSE" is deleted. If there is a record whose layer value is 3 and enlarging flag value is "TRUE", the layer value of the record is updated to "−1". The case that the layer value is "−1" indicates that the image circle to be erased originally is not erased since the image circle is enlarged.

Next, the image drawing unit 16 sets "the latest retrieval number minus 4" to variant N and sets 1 to variant I in S111. Here, the latest retrieval number indicates the retrieval number of the last record in the retrieval history storing unit 121. That is, the retrieval number for the retrieval this time. In FIG. 15, the latest retrieval number is 6. As a result, 2 (i.e., 6 minus 4) is set to N in this case.

Next, the image drawing unit 16 determines whether or not the retrieval result whose retrieval number is equal to N (i.e., the retrieval result whose retrieval number is equal to N) is stored in the retrieval history storing unit 121 in S112. If the corresponding record is not stored (NO in S112), the operation proceeds to step S116. If the corresponding record is stored (YES in S112), the image drawing unit 16 checks a new layer for the retrieval result corresponding to the record based on the value of variant i in S113. In this embodiment, the layers are defined as illustrated in FIG. 5. Consequently, the third layer corresponds to variant i that is equal to 1, and the second layer corresponds to variant i that is equal to 2. The first layer corresponds to variant i whose value is equal to or larger than 3 and equal to or less than 5.

Next, the image drawing unit 16 updates the size value and the layer value stored in the drawing information storing unit 122 regarding the image circle for images corresponding to the retrieval result whose number of times is N in S114. The size value is modified to the size in accordance with the value of variant i. Here, regarding the size in accordance with the value of variant i, small 3 size for variant i that is equal to 1, small 2 size for variant i that is equal to 2, small size for variant i that is equal to 3, and medium size for variant i that is equal to 4. The layer is updated to the value determined in S113.

Next, the image drawing unit 16 reflects the modification of the size of the image circle in S114 to the projection target image i1 in S115. As a result, regarding the image circle, the size projected to the operation area A1 is modified. However, the image circle whose value of the enlarging flag is "TRUE" (i.e., enlarged image circle) is excluded from the target to be reflected to the projection target image i1. That is, the status of the enlarged image circle is maintained as is.

Next, in S115, regarding the image circles whose size is modified in S114, the image drawing unit 16 updates the size value in the record stored in the drawing information storing unit 122 to the modified value and updates the layer value in the corresponding record to the value determined in S113.

Next, the image drawing unit 16 adds 1 to variant N and adds 1 to variant i in S116. Subsequently, the image drawing unit 16 determines whether or not the value of variant N exceeds the value that is equal to "the latest retrieval number minus 1" in S117. That is, it is determined whether or not the value of variant N exceeds the retrieval number corresponding to the previous retrieval. If the value of variant N is equal to or less than "the latest retrieval number minus 1" (NO in S117), operations after step S112 are repeated.

If the value of variant N is larger than "the latest retrieval number minus 1" (YES in S117), at S118, the image drawing unit 16 draws on the projection target image i1 the image circles each including the image corresponding to the image ID in the image ID group in the record stored in the retrieval history storing unit 121, as the retrieval result whose retrieval number is N (i.e., the retrieval result this time). That is, the image circle for images corresponding to the retrieval result this time is drawn. In this case, the size of the image circles is considered as large size. The drawing position and orientation for the image circles may be determined at random.

Next, the image drawing unit 16 adds the record for the image circles drawn in S115 to the drawing information storing unit 122. More specifically, "1" is stored in the layer field in the corresponding record, and "large" is stored in the size field in the corresponding record.

It should be noted that, regarding each of the image circles drawn in the projection target image i1, the image drawing unit 16 modifies the position and orientation randomly at a predetermined interval for example. The modified position and orientation are reflected to the drawing information storing unit 122 sequentially.

On the other hand, if user operation on the operation area A1 is detected by the operation detecting unit 18 (YES in S120), the operation in accordance with user operation is performed in S121.

Next, the operation in S121 is described in detail below. FIGS. 17A and 17B are a flowchart illustrating operations performed in accordance with user operation in this embodiment.

In S201, the operation detecting unit 18 determines whether or not the operation target corresponds to the enlarged image circle. That is, the drawing information storing unit 122 determines whether or not the record whose value of the enlarging flag is "TRUE" exists and the coordinate values of the detected user operation is within the range of the image circle (enlarged image circle) corresponding to the record. Here, the range of the image circle corresponds to the range of the circle whose center corresponds to the coordinate values of the corresponding record and diameter corresponds to the enlarged image circle. It should be noted that the detected position of user operation may be converted to coordinate values in the coordinate system of the projection target image i1.

If the operation target corresponds to the enlarged image circle (YES in S201), the image drawing unit 16 performs a drawing operation in accordance with user operation in S202. That is, as illustrated in FIG. 8, in case of pinch-out, the image in the enlarged image circle is enlarged. In case of pinch-in, the image in the enlarged image circle is reduced. In addition, in case of drag-and-drop, the image in the enlarged image circle is scrolled (moved).

By contrast, if the operation target does not correspond to the enlarged image circle (NO in S201), the operation detecting unit 18 determines whether or not the operation type corresponds to tap in S203. In determining the operation type, it is possible to utilize known technologies.

If the operation type corresponds to tap (YES in S203), the image drawing unit 16 determines whether or not the enlarged image circle exists in S204. Whether or not the enlarged image circle exists may be determined by checking whether or not a record whose value of the enlarging flag is "TRUE" is stored in the drawing information storing unit 122. If the record whose value of the enlarging flag is "TRUE" is not stored in the drawing information storing unit 122 (NO in S204), the operation proceeds to step S209.

If the record whose value of the enlarging flag is "TRUE" is stored in the drawing information storing unit 122 (YES in S204), the image drawing unit 16 erases the image circle regarding the corresponding record (i.e., the enlarged image circle) from the projection target image i1 in S205. Next, the image drawing unit 16 determines whether or not the value of the layer in the corresponding record is equal to "−1" in S206. If the value of the layer in the corresponding record is equal to "−1" (YES in S206), the image drawing unit 16 deletes the corresponding record from the drawing information storing unit 122 in S207. That is, the image circle regarding the corresponding record is not displayed. By contrast, if the value of the layer in the corresponding record is not equal to "−1" (NO in S206), the image drawing unit 16 updates the value of the enlarging flag in the corresponding record to "FALSE" and draws the image circle including the image regarding the image ID in the corresponding record on the projection target image i1 at the size stored in the corresponding record in S208. In this case, the position and orientation in the corresponding record is updated in accordance with the drawing position and orientation of the image circle. It should be noted that the image circle may be drawn at the operation point (the tapped point) or the circle image may be drawn at an arbitrary position.

Next, the image drawing unit 16 determines whether or not the image circle belonging to the first layer is the operation target (tapped target) in S209. The range of the image circle belonging to the first layer may be specified based on the record whose layer value is equal to 1 stored in the drawing information storing unit 122. That is, the range of the circle whose center is equal to the coordinate values in the corresponding record and diameter is equal to the size in the corresponding record is the range to be specified described above. As a result, if the coordinate values of the detected operation point are included anywhere in the specified range, it is determined that the image circle belonging to the first layer is the operation target.

If the image circle belonging to the first layer is the operation target (YES in S209), the image drawing unit 16 erases the image circle as the operation target from the projection target image i1 in S210. Subsequently, the image drawing unit 16 draws the enlarged image circle for the image regarding the corresponding image circle on the projection target image i1 in S211. The enlarged image circle is drawn at a position corresponding to the center of the operation area A1. Subsequently, the image drawing unit 16 updates the values of the position and the enlarging flag in the record stored in the drawing information storing unit 122 corresponding to the enlarged image circle in S212. The position is updated to the coordinate value of the center of the operation area A1. The enlarging flag is updated to "TRUE".

If the operation type does not correspond to tap (NO in S203) and corresponds to drag-and-drop (YES in S213), just like step S209, the image drawing unit 16 checks whether or not the image circle belonging to the first layer is the operation target in S214. If the image circle belonging to the first layer is the operation target (YES in S214), the image drawing unit 16 moves the drawing position of the image circle as the operation target to a position corresponding to the drop destination on the projection target image i1 in S215. Subsequently, the image drawing unit 16 updates the position in the record stored in the drawing information storing unit 122 corresponding to the image circle to the coordinate values of the moved destination in S216.

As described above, in this embodiment, if any one of the users surrounding the conversation facilitating apparatus 1 makes some sort of remark, an image group related to the content of the remark is displayed on the operation area A1. After browsing the image group, if any one of the users further makes some sort of remark, another image group related to the content of the remark is further displayed on the operation area A1. As described above, the image groups of the retrieval results may facilitate user remarks. That is, it is possible to support facilitating conversations between users.

In addition, unexpected images may be included in the image groups. By displaying those unexpected images, it is possible to lead the conversation to an unexpected subject.

In addition, as the retrievals are repeatedly performed, the image circles displayed in the previous retrieves become reduced and inoperable. As a result, it is possible to prevent users from being confused due to mixture of many images after performing retrievals repeatedly. That is, it is possible to determine a retrieval timing of an image included in an image circle in accordance with a size of the image circle.

In addition, by displaying images of retrieval results from several past retrievals, development by the time the latest image is displayed may be grasped.

It should be noted that the case that the retrieval target is images in this embodiment is described above. This is because an image is intuitive information compared to a string and considered to be suitable for facilitating conversations. However, it is possible to consider information other than an image (such as a string) as the retrieval target and display the string included in the image circle.

In addition, in this embodiment, the case that the retrieved image is displayed in a circular shape is described above. However, the retrieved image may be displayed in other shapes, or the retrieved image may be displayed in its original shape as is.

In addition, in this embodiment, the case that the timing of retrieval may be specified by the number of retrieval times is described. That is, the layer and size of the image circle may be determined based on the fact that the image circle is from the retrieval how many retrieval times before using the number of retrieval times from the latest retrieval as a basis (i.e., as a standard). However, the timing of retrieval may be determined by time. For example, a layer and size of an image circle may be determined based on a period of time elapsed from the retrieval that the image in the image circle is retrieved to the latest retrieval.

In addition, a liquid crystal display may be used for projecting images instead of using the projector 20.

In addition, the conversation facilitating apparatus 1 may be used for not only a business purpose but also an amusement purpose. For example, the conversation facilitating apparatus 1 may be laid out on a table in a restaurant or coffee shop etc. The conversation facilitating apparatus 1 may also be used for other purposes.

It should be noted that the projector 20 is an example of an image projecting apparatus in this embodiment. The voice recognition unit 12 is implemented by circuitry that performs conversion. The image retrieving unit 15 is an example of circuitry that performs retrievals. The image drawing unit 16 is an example of circuitry that draws an image etc. The enlarged image circle is an example of a shape displayed in a predetermined size. The timing when the image belonging to the third layer is retrieved is an example of a first timing. The timing when the image belonging to the first layer is retrieved is an example of a second timing. The operation area A1 is an example of a projection surface.

The embodiments described above provide an image processing apparatus that may support facilitating conversations.

It should be noted that the case that the computer apparatus reads and executes the program code is just one example to implement the functional units in the embodiments described above. In addition, in accordance with instructions by the program code, an operating system (OS) running on the computer apparatus may perform a part of the operations or all operations. Furthermore, the functional units described in the above embodiments may obviously be implemented by performing those operations.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus, comprising:
   circuitry to
     convert user voices that are input into a string of characters reflecting a statement made with the user voices;
     retrieve information related to the string;
     store the information in association with identification information indicating a retrieval time at which the information is retrieved;
     draw a graphical image including the information on a projection target image to be projected by a projector; and
     control the projector to project the projection target image including the graphical image, the graphical image having a size that is determined based on the identification information indicating the retrieval time of the information included in the graphical image being projected.

2. The image processing apparatus according to claim 1, wherein the circuitry is further configured to control the size of the graphical image being projected, such that a first graphical image including the information whose retrieval time is relatively later is displayed in size smaller than a size of a second graphical image including second information whose retrieval time is relatively earlier.

3. The image processing apparatus according to claim 1, wherein the circuitry is further configured to erase, from the projection target image, the graphical image including the retrieved information before a first time counted from a latest retrieval.

4. The image processing apparatus according to claim 1, wherein the circuitry is further configured to:
   detect a user operation performed on a projection surface on which the projection target image is projected; and
   enlarge the graphical image displayed near a position where the user operation is detected to a predetermined size.

5. The image processing apparatus according to claim 4, wherein the circuitry is further configured to enlarge the graphical image to the predetermined size, when the graphical image displayed near the position where the user operation is detected includes the information retrieved after a second time counted from a latest retrieval.

6. The image processing apparatus according to claim 4, wherein the circuitry is further configured to maintain a size of the graphical image whose size is the predetermined size regardless of the retrieval time, when the information included in the graphical image is retrieved.

7. The image processing apparatus according to claim 5, wherein the circuitry is further configured to:
   maintain a size of the graphical image whose size is the predetermined size regardless of the retrieval time, when the information included in the graphical image is retrieved; and
   when the graphical image that includes the information retrieved after the second time counted from the latest retrieval is not near the position where the user operation is detected, determine to draw or erase the graphical image of the predetermined size depending on the retrieval time, when the information included in the graphical image is retrieved.

8. The image processing apparatus according to claim 1, wherein the circuitry is further configured to retrieve an image related to the string as the information related to the string.

9. The image processing apparatus of claim 1, wherein the circuitry is further configured to retrieve other information related to the string, draw another graphical image including the other information, and control the projector to project the projection target image, which includes the graphical image and the another graphical image, so that the graphical image and the another graphical image have a same size.

10. A method of processing an image performed by an image processing apparatus, the method comprising:
converting user voices that are input into a string of characters reflecting a statement made with the user voices;
retrieving information related to the string;
storing the information in association with identification information indicating a retrieval time at which the information is retrieved;
drawing a graphical image including the information on a projection target image to be projected by a projector; and
controlling the projector to project the projection target image including the graphical image, the graphical image having a size that is determined based on the identification information indicating the retrieval time of the information included in the graphical image being projected.

11. The method of processing an image according to claim 10, further comprising:
controlling the size of the graphical image being projected, such that a first graphical image including first information whose retrieval time is relatively later is displayed in size smaller than a size of a second graphical image including second information whose retrieval time is relatively earlier.

12. The method of processing an image according to claim 10, further comprising:
erasing, from the projection target image, the graphical image including the retrieved information before a first time counted from a latest retrieval.

13. The method of processing an image according to claim 10, further comprising:
detecting a user operation performed on a projection surface on which the projection target image is projected; and
enlarging the graphical image displayed near a position where the user operation is detected to a predetermined size.

14. The method of processing an image according to claim 13, further comprising:
enlarging the graphical image to the predetermined size, when the graphical image displayed near the position where the user operation is detected includes the information retrieved after a second time counted from a latest retrieval.

15. The method of processing an image according to claim further comprising:
maintaining a size of the graphical image whose size is the predetermined size regardless of the retrieval time, when the information included in the graphical image is retrieved.

16. The method of processing an image according to claim 14, further comprising:
maintaining a size of the graphical image whose size is the predetermined size regardless of the retrieval time, when the information included in the graphical image is retrieved; and
when the graphical image that includes the information retrieved after the second time counted from the latest retrieval is not near the position where the user operation is detected, determining to draw or erase the graphical image of the predetermined size depending on the retrieval time, when the information included in the graphical image is retrieved.

17. The method of processing an image according to claim 10, the method further comprising:
retrieving an image related to the string as the information related to the string.

18. A non-transitory computer-readable recording medium storing a program that, when executed by one or more processors of an image processing apparatus, causes the one or more processors to implement a method of processing an image, comprising:
converting user voices that are input into a string of characters reflecting a statement made with the user voices;
retrieving information related to the string;
storing the information in association with identification information indicating a retrieval time at which the information is retrieved;
drawing a graphical image including the information on a projection target image to be projected by a projector; and
controlling the projector to project the projection target image including the graphical image, the graphical image having a size that is determined based on the identification information indicating the retrieval time of the information included in the graphical image being projected.

* * * * *